United States Patent [19]
Bushman

[11] 3,887,062
[45] June 3, 1975

[54] SIDE ENTRY HOPPER FOR ROTARY FRUIT FEEDER

[75] Inventor: Ronald C. Bushman, Hacienda Heights, Calif.

[73] Assignee: Brown International Corporation, Covina, Calif.

[22] Filed: Feb. 26, 1973

[21] Appl. No.: 336,031

[52] U.S. Cl. .............................. 198/52; 198/212
[51] Int. Cl. ........................................... B65g 47/18
[58] Field of Search ............ 198/44, 45, 46, 47, 48, 198/50, 59, 60, 52, 212, 53

[56] References Cited
UNITED STATES PATENTS

| | | | |
|---|---|---|---|
| 2,494,103 | 1/1950 | Penberthy | 198/45 |
| 2,618,374 | 11/1952 | Rahlson | 198/46 |
| 3,321,064 | 5/1967 | Sanders et al. | 198/45 |
| 3,342,314 | 9/1967 | Holbrook | 198/212 |
| 3,635,326 | 1/1972 | Langlinais | 198/52 |

FOREIGN PATENTS OR APPLICATIONS 515,679  12/1952  Belgium ............................. 198/59

Primary Examiner—Evon C. Blunk
Assistant Examiner—Richard K. Thomson
Attorney, Agent, or Firm—Paul A. Weilein

[57] ABSTRACT

A side entry hopper for feeding fruit to the pockets of a rotary fruit feeder of the type shown in Holbrook U.S. Pat. No. 3,342,314 is provided with a flat surfaced ramp inclining downward towards the bottom portion of the circular orbit of the pockets, with a terminal portion of the ramp dropping down to form with the rotary feeder a reservoir for fruit at the entrances to the travelling pockets.

6 Claims, 4 Drawing Figures

SIDE ENTRY HOPPER FOR ROTARY FRUIT FEEDER

BACKGROUND OF THE INVENTION

The invention relates to a rotary fruit feeder of the character disclosed in Holbrook U.S. Pat. No. 3,342,314, which patent is hereby incorporated into the present disclosure by reference. More particularly, the invention pertains to the structure of the side entry hopper of such a rotary fruit feeder.

In the Holbrook disclosure, one side of the rotary fruit feeder is open to the side entry hopper and the opposite side or outer side of the rotary fruit feeder is closed by a disc that is mounted on the hub of the feeder with a circular series of pockets for fruit mounted on the inner face of the disc at the periphery of the disc. The bottom of the side entry hopper of the Holbrook disclosure is inclined downward for gravitational movement of the fruit to the rotary fruit feeder and the bottom of the hopper is of curved transverse cross sectional configuration with the curvature conforming to the curvature of the circular orbit of the travelling pockets.

The rotary fruit feeder supplies fruit to a pair of convergent cooperative cup-chain conveyors where the fruit is cut into halves and the halves are reamed to extract the fruit juice. To synchronize the travel of the peripheral pockets of the rotary fruit feeder with the travel of the cups of the pair of cooperating conveyors, the cooperating conveyors are power driven and their cups mesh with the rotary fruit feeder for actuation thereof.

The theoretical production capacity of the apparatus in fruit per minute is the product of the rpm of the rotary fruit feeder and the number of its pockets. The apparatus operates typically at such a high rate of speed, that it is not possible by casual observation to ascertain whether or not the apparatus is performing up to its potential. It is possible, however, to sight for light through the travelling pockets of the rotary feeder laterally of the feeder in the region of discharge of the fruit to the cooperating conveyors to detect empty pockets which cause the light to flicker. Such a rough check may be made by suitable means to detect and count the flickers of light along the line of sight. It has been found that the apparatus usually operates at well under its capacity, for example, less than 70 percent of the potential output of the apparatus.

From the foregoing, it is apparent that there is a pressing need for increasing the output of such a rotary fruit feeder by increasing the number of the available pockets of the feeder that are supplied with fruit.

SUMMARY OF THE INVENTION

The present invention is based on the discovery that the transverse curvature of the trough formed by the bottom of the conventional side entry hopper is the cause of the failure of the hopper to fill all of the successive pockets of the rotary fruit feeder. Since the trough of the hopper slopes longitudinally downward towards the rotary fruit feeder, it would seem that the fruit would be urged gravitationally into the successive travelling pockets over the width of a substantial arc at the bottom of the circular orbit of the pockets. It has been found, however, that the gravitational tendency of the rolling fruit to crowd from both sides towards the lowermost centerline of the trough substantially narrows the width of the arc at the bottom of the orbit along which the fruit is presented to the travelling pockets. The narrowing of the arc along which the fruit is presented to the travelling pockets reduces the time period in which a fruit from the supply stream has opportunity to enter a travelling pocket. It has been further discovered that with the gravitational tendency of the fruit to seek the centerline of the bottom of the hopper, the fruit tends to jam together as it approaches the rotary feeder and the jamming action interferes with the freedom of the fruit to enter the travelling pockets in the brief time that the pockets are exposed to the supply of fruit.

Pursuant to the above discussed discovery of the cause of the failure of the supply fruit to occupy all of the successive travelling pockets of the rotary feeder, a primary object of the invention is twofold. One purpose is to widen the arc of the orbit of the travelling pockets along which the fruit is available to the pockets and thus increase the time interval in which each travelling pocket is exposed to the gravitationally urged fruit. The other purpose is to eliminate the jamming action in the fruit stream as the stream approaches the rotary feeder.

These two objects are accomplished by employing a flat inclined ramp for the travelling fruit instead of an inclined trough of curved cross sectional configuration and the two objects are further achieved by providing the ramp with a terminal portion that drops off abruptly to a discharge end that conforms to the arcuate path of the travelling pockets. With the flat surface of the inclined ramp conforming to a horizontal chord of the bottom portion of the orbit of the travelling pockets, the tendency for the travelling fruit to seek the centerline of the ramp is entirely eliminated and the travelling stream of fruit freely spreads over the full width of the ramp. The chord of the circular orbit that is defined by the width of the flat ramp is, of course, smaller in extent than the arc of the orbit that the chord subtends but the terminal portion of the ramp that drops off fans out to the full length of the subtended arc.

In the preferred practice of the invention the terminal portion of the ramp is of the configuration of a portion of a cone and thus forms a smooth transition from the surface of the flat ramp to the arcuate path of the travelling pockets of a rotary feeder. The inclination of the ramp proper is closer to horizontal than to vertical but the inclination of the terminal portion of the ramp is closer to vertical than to horizontal and consequently the terminal portion of the ramp forms a nearly vertical fruit reservoir at the open side of the rotary feeder. This reservoir helps to compensate for surges in the supply of fruit to the ramp. Gravity effective in the reservoir thrusts the fruit towards the travelling pockets and is advantageous in encouraging the fruit to enter the travelling pockets. This helpful gravitation of the fruit substantially in its direction of travel is in contrast to a gravitational thrust that is nearly perpendicular to the direction of travel wherein the perpendicular thrust is combined with a trough of curved cross section with consequent jamming of the fruit against the curved bottom of a trough.

A feature of the invention is that the downwardly extending terminal portion of the ramp forms one wall of the reservoir and the disc of the rotary fruit feeder forms the opposite wall of the reservoir, the two walls being substantially parallel in cross section. An advantage of this arrangement is that since the disc rotates continuously, one wall of the reservoir continuously moves in its plane and thus tends to roll the fruit sidewise in the reservoir. At the same time the pockets at the bottom of the reservoir travel laterally of the reservoir for further agitation of the fruit in the reservoir. The agitation of the fruit in the reservoir in these two ways acts against any tendency of the fruit to jam and actively encourages the fruit to seek out travelling pockets in the brief time periods that the pockets are available to the fruit.

The features and advantages of the invention may be understood by reference to the following detailed description and the accompanying drawings.

BRIEF DESCRIPTION OF THE DRAWINGS

In the drawings, which are to be regarded as merely illustrative.

DESCRIPTION OF THE PREFERRED EMBODIMENT OF THE INVENTION

Figure 1:
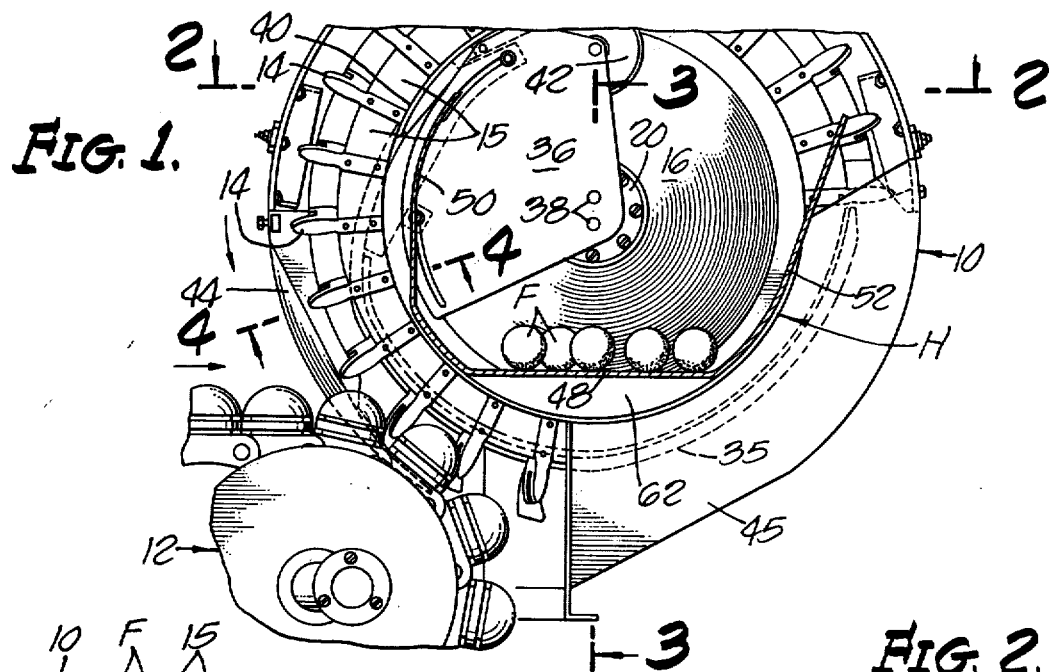
FIG. 1 is a fragmentary elevational view, partly in section, showing the portion of a fruit processing apparatus to which the present invention pertains.

FIG. 1 shows a rotary fruit feeder, generally designated by numeral 10, which supplies citrus fruit to a cup-chain conveyor, generally designated by numeral 12, wherein the fruit is cut into halves and the halves are reamed for extraction of the citrus fruit juice. The rotary fruit feeder has a circumferential series of radial blades 14 which form travelling pockets 15 that receive the fruit from a side entry hopper that is generally designated H in FIGS. 2 and 3.

Figure 3:
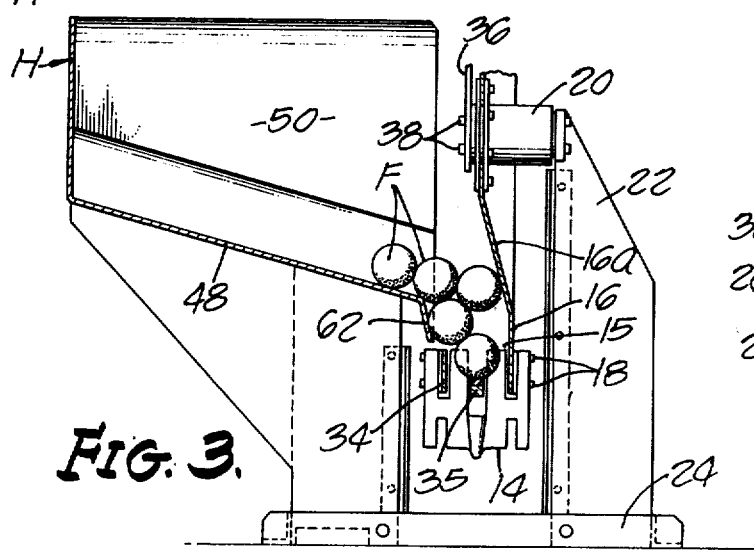
FIG. 3 is a fragmentary vertical section taken along the line 3—3 of FIG. 1.
Figure 4:
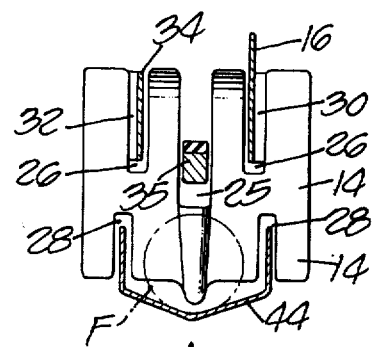
FIG. 4 is a sectional view of a pocket of the rotary feeder as seen along the radial line 4—4 of FIG. 1.

As shown in section in FIG. 3 the closed outer side of the rotary feeder, which is the far side in FIG. 1, is formed by a disc 16 and the radial blades 14 are mounted on the disc by suitable fastening means 18. The disc 16 is mounted on a rotary hub 20 that rotatably embraces a concealed stationary stub shaft on support structure 22 that extends upward from the base 24 of the apparatus. Each of the radial blades 14 is of the configuration shown in FIG. 4 where it can be seen that the blade is formed with the following slots: a main central radially inwardly extending slot 25; a pair of radially inwardly extending slots 26; and a pair of radially outwardly extending slots 28. The disc 16 extends into one of the slots 26 of each of the radial blades and carries a series of blocks 30 to which the blades are directly connected. Fixedly attached to sides of the other slots 26 of the radial blades are corresponding blocks 32 to which are welded a light sheet metal ring 34. Thus the outer wall of each pocket 15 is formed by the disc 16 and the inner wall of the pocket is formed by the light sheet metal ring 34.

The bottoms of the travelling pockets 15 when the pockets are at the lower part of their circular orbit are formed by a stationary rail 35 that extends into the main slots 25 of the radial blades throughout most of the orbit of the pockets. The fixed rail 35 is carried by a support plate 36 shown in FIG. 1 which is secured by fastening elements 38 to the outer end of the previously mentioned fixed stub shaft. The fixed rail has a nose piece 40 and is helical or spiral in configuration.

Initially the fruit, designated F, that is supplied to the travelling pockets 15 rest on the radially inward side of fixed rail 35 as shown in FIG. 3. The counterclockwise rotation of the rotary feeder as viewed in FIG. 1 carries the newly received fruit to the upper half of the orbit of the travelling pockets where the fruit is boosted by a roller 42 onto the nose piece 40 of the rail so that as the travelling pockets again enter the lower half of their orbit the fruit are on the radially outward side of the fixed rail as may be seen in FIG. 4. As the fruit enter the lower half of their orbit they encounter a stationary transfer chute 44 that is an extension of the fixed cover 45 of the rotary feeder. As shown in section in FIG. 4 the transfer chute 44 supports the travelling fruit and as shown in FIG. 1 the transfer chute delivers the fruit to the cup-chain conveyor 12.

All of the structure described to this point is found in the above-mentioned Holbrook patent. The improvement that constitutes the present invention will now be described.

The invention relates to the structure of the side entry hopper H that supplies fruit to the rotary fruit feeder 10. The side entry hopper H has a flat bottom wall 48 that slopes downward towards the rotary fruit feeder 10 to serve as a delivery ramp and the hopper is formed with two upwardly extending side walls 50 and 52 respectively on opposite sides of the delivery ramp. The side wall 52 has an opening 54 to a bypass chute 55 to release fruit from the hopper in the event that excess fruit is delivered to the hopper.

Figure 2:
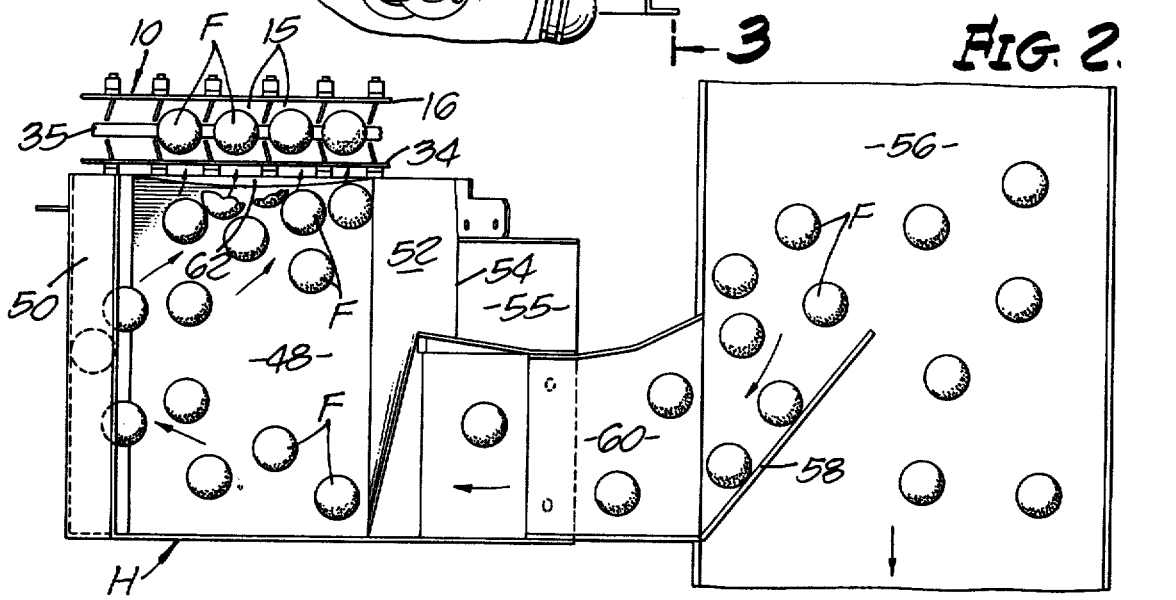
FIG. 2 is an enlarged fragmentary plan view, partly in section, as seen along the line 2—2 of FIG. 1.

As shown in FIG. 2 the fruit to be processed may be supplied by a conveyor belt 56 and fruit on the conveyor belt is diverted by an inclined rod 58 to a downwardly inclined supply chute 60 that delivers the fruit to the side entry hopper H laterally thereof at the upper end of the inclined ramp 48. As indicated in FIG. 2, the supply chute 60 directs some of the fruit against the side wall 50 in one diagonal direction because of the downward slope of the ramp 48 and the side wall deflects the fruit in the opposite diagonal direction to distribute the fruit across the width of the ramp.

As may be seen in FIG. 1, the ramp 48 is level or horizontal in transverse cross section so that there is no gravitational interference with the freedom of the fruit to spread over the width of the ramp. It is also apparent in FIG. 1 that the ramp 48 conforms to a horizontal chord of the bottom portion of the circular orbit of the travelling pockets 15.

The ramp 48 has a terminal portion or extension 62 that is shown in plan in FIG. 2 and is shown in section in FIG. 3. The terminal portion 62 of the ramp is of the configuration of a concave portion of a cone with the edge of the terminal portion fanning out to conform to the arc of the orbit that is subtended by the ramp 48. As indicated in FIG. 3, the disc 16 has a convex conical portion 16a which overhangs the travelling pockets 15 in the lower half of the orbit of the pockets. The conical terminal portion 62 of the ramp is concentric to the conical portion 16a of the disc 16 of the rotary feeder and is uniformly spaced therefrom. Consequently, the cross section of the terminal portion 62 of the ramp 48 is parallel with the cross section of the conical portion 16a to form a reservoir for the fruit. The fruit in the reservoir is urged gravitationally into the travelling pockets 15 at the bottom of the reservoir and with the disc 16 moving in its plane relative to the terminal portion 62 of the ramp the disc rubs against the fruit in the reservoir to tend to roll the fruit and thus agitate the fruit. Additional agitation of the fruit is caused by the travel of the pockets 15 across the bottom of the reservoir.

It is apparent that the flat ramp 48 allows the fruit to spread freely over the width of the chord of the orbit of the travelling pockets and that the terminal portion of the ramp permits the fruit to fan out over the full width of the arc of the orbit that is subtended by the ramp. Thus, with the fruit available to the travelling pockets over the full extent of the subtended arc of the orbit of the pockets, time periods of relatively long duration are provided for each of the travelling pockets to receive a new fruit. The reservoir formed by the terminal portion of the ramp 62 in cooperation with the disc 16 maintains a body of fruit immediately above the travelling pockets with gravity directing the fruit into the travelling pockets and any tendency for the fruit to jam is relieved by agitation of the fruit by the travel of the portion of the disc 16 that forms the outer wall of the reservoir.

The above description in specific detail of the preferred embodiment of the invention will suggest various changes, substitutions and other departures from my disclosure within the spirit and scope of the appended claims.

I claim:

1. In a fruit processing apparatus wherein a side entry hopper supplies fruit of generally spherical configuration to an open side of an upright rotary fruit feeder that has a circumferential series of pockets which are open from above as they pass through the bottom portion of their circular orbit;

the improvement comprising:

the bottom of the hopper being in the form of a substantially flat surfaced ramp inclined downward towards said bottom portion of the circular orbit to cause the fruit to roll gravitationally down the ramp towards the pockets, a terminal portion of the ramp dropping off and conforming to the arcuate path of the pockets to urge fruit gravitationally into the individual pockets as the pockets pass through the bottom of the circular orbit;

said terminal portion of the ramp having the configuration of a concave surface of a portion of a cone having its lower edge conforming to the curvature of said bottom portion of the circular orbit.

2. An improvement as set forth in claim 1 in which the slope of the ramp is closer to horizontal than to vertical and the slope of the terminal portion of the ramp is closer to vertical than to horizontal.

3. A combination as set forth in claim 2 which includes a chute arranged transversely of the upper end of the ramp to supply fruit to the upper end of the ramp and in which the ramp is substantially longer than it is wide to give the fruit opportunity to spread over the width of said terminal portion of the ramp.

4. In a fruit processing apparatus wherein a side entry hopper supplies fruit of generally spherical configuration to an open side of an upright rotary fruit feeder that has a circumferential series of pockets which are open from above as they pass through the bottom portion of their circular orbit;

the improvement comprising:

the bottom of the hopper being in the form of a substantially flat surfaced ramp inclined downward towards said bottom portion of the circular orbit to cause the fruit to roll gravitationally down the ramp towards the pockets, a terminal portion of the ramp dropping off and conforming to the arcuate path of the pockets to urge fruit gravitationally into the individual pockets as the pockets pass through the bottom of the circular orbit;

said terminal portion of the ramp having the configuration of a concave portion of a cone with its lower edge conforming to the curvature of said bottom portion of the circular orbit;

the plane of the flat bottom of the hopper subtending an arc of the orbit at the bottom of the orbit;

said terminal portion of the ramp having the configuration of a portion of a cone with its lower edge conforming to said arc; said arc spanning a plurality of said pockets.

5. In a fruit processing apparatus, the combination of:

a rotary fruit feeder rotating in a substantially upright plane, said rotary feeder having a circumferential series of pockets, said pockets being accessible at one of the two faces of the feeder;

a fixed side entry hopper adjacent said one face of the feeder, the bottom of the hopper being in the form of a substantially flat surfaced ramp inclined downward towards said bottom portion of the circular orbit for feeding fruit gravitationally to said pockets, a terminal portion of the ramp dropping off and conforming to an arc concentric to the axis of rotation of the feeder, said arc spanning a plurality of said pockets;

means on the rotary feeder to prevent movement of the fruit through the rotary feeder transversely of the plane of rotation of the rotary feeder;

said preventing means comprising a disc concentric to the axis of rotation of the feeder;

said disc being conical with the convex side of the disc facing the side entry hopper and overhanging said pockets, said disc rotating with the feeder and cooperating with said fixed terminal portion of the ramp to form a downwardly sloping passage to said pockets when the pockets are in the bottom portion of their circular orbit;

the opposite walls of said passage being parallel in vertical cross section.

6. In a fruit processing apparatus wherein a side entry hopper supplies fruit to an open side of a rotary fruit feeder that has a circumferential series of pockets which are open from above as they pass through the bottom portion of their circular orbit, the improvement comprising:

the bottom of the hopper being in the form of a substantially flat surfaced ramp inclined downward towards said bottom portion of the circular orbit for feeding fruit gravitationally to the pockets;

a terminal portion of the ramp dropping off and conforming to the arcuate path of the pockets to urge fruit gravitationally into the individual pockets as the pockets pass through the bottom of the circular orbit;

the structure of the rotary fruit feeder including a disc on its side opposite from the ramp;

said pockets of the rotary fruit feeder structure being mounted on the inner side of the disc at the periphery of the disc;

the inner radial portion of the disc overhanging the pockets along said bottom portion of the circular orbit;

said disc being of conical curvature and inclined away from the ramp towards the outer side of the pockets to divert the fruit into the pockets;

and the terminal portion of the ramp being conically curved and in cross section substantially parallel to the conical curved portion of the disc to form with the disc a substantially upright reservoir for the fruit at the entrances to the pockets.

* * * * *